US011148957B2

(12) United States Patent
Le Breton et al.

(10) Patent No.: US 11,148,957 B2
(45) Date of Patent: Oct. 19, 2021

(54) METHOD AND SYSTEM FOR RECOVERING RARE EARTH ELEMENTS FROM WITHIN AN OBJECT

(71) Applicants: CENTRE NATIONAL DE LA RECHERCHE SCIENTIFIQUE, Paris (FR); UNIVERSITE DE ROUEN-NORMANDIE, Mont Saint Aignan (FR); INSTITUT NATIONAL DES SCIENCES APPLIQUEES DE ROUEN NORMANDIE, Saint-Etienne-du-Rouvray (FR)

(72) Inventors: Jean-Marie Le Breton, Saint Pierre de Manneville (FR); Nicolas Maât, Mont-saint-aignan (FR); Virginie Nachbaur, Montaure (FR)

(73) Assignees: CENTRE NATIONAL DE LA RECHERCHE SCIENTIFIQUE, Paris (FR); UNIVERSITE DE ROUEN-NORMANDIE, Mont Saint Aignan (FR); INSTITUT NATIONAL DES SCIENCES APPLIQUEES DE ROUEN NORMANDIE, Saint-Etienne-du-Rouvray (FR)

( * ) Notice: Subject to any disclaimer, the term of this patent is extended or adjusted under 35 U.S.C. 154(b) by 287 days.

(21) Appl. No.: 15/767,852

(22) PCT Filed: Oct. 13, 2016

(86) PCT No.: PCT/EP2016/074604
§ 371 (c)(1),
(2) Date: Apr. 12, 2018

(87) PCT Pub. No.: WO2017/067844
PCT Pub. Date: Apr. 27, 2017

(65) Prior Publication Data
US 2018/0304325 A1    Oct. 25, 2018

(30) Foreign Application Priority Data

Oct. 19, 2015  (FR) ........................ 1559949

(51) Int. Cl.
*C01F 17/224*  (2020.01)
*B09B 5/00*   (2006.01)
(Continued)

(52) U.S. Cl.
CPC ............. *C01F 17/224* (2020.01); *B09B 3/00* (2013.01); *B09B 3/0083* (2013.01); *B09B 5/00* (2013.01);
(Continued)

(58) Field of Classification Search
CPC ........ C22B 59/00; C01F 17/10; C01F 17/206; B09B 3/0083; B09B 3/00; B09B 5/00; C01G 49/08
See application file for complete search history.

(56) References Cited

U.S. PATENT DOCUMENTS 8,734,714 B2   5/2014  Harris et al.
9,322,082 B2   4/2016  Hoshi et al.
(Continued)

FOREIGN PATENT DOCUMENTS

CN  103717764 A  4/2014
CN  104053801 A  9/2014
(Continued)

OTHER PUBLICATIONS

International Search Report, dated Jan. 25, 2017, from corresponding PCT application No. PCT/EP2016/074604.
(Continued)

*Primary Examiner* — Scott R Kastler
(74) *Attorney, Agent, or Firm* — Nixon & Vanderhye

(57) ABSTRACT

Disclosed is a method and system for recovering at least rare earth elements from within an object A consisting of at least
(Continued)

Figure 1:
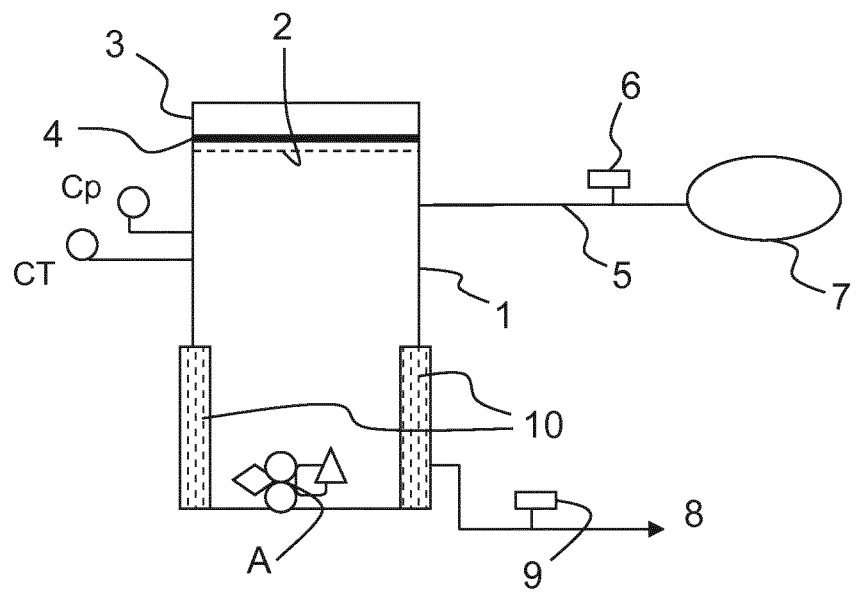

one first rare earth portion or a mixture of rare earth elements and a second metal portion. The method includes a solvothermal treatment step that places the object in contact with a fluid for causing at least one rare earth portion and/or mixture of rare earth elements and the metal portion to oxidize in order to separate same, the value of the reaction temperature Tr is selected according to the nature of the object, the reaction following a R-M→R(X)x+M(X)y scheme, where R is the rare earth element or a mixture of rare earth elements, M is the transition metal, and (X) is a group which depends on the fluid used.

12 Claims, 3 Drawing Sheets

(51) Int. Cl.
*C01G 49/08* (2006.01)
*B09B 3/00* (2006.01)

(52) U.S. Cl.
CPC .......... *C01G 49/08* (2013.01); *C01P 2004/03* (2013.01); *C01P 2004/10* (2013.01); *C01P 2004/41* (2013.01)

(56) References Cited

U.S. PATENT DOCUMENTS

| | | | |
|---|---|---|---|
| 2014/0283652 A1 | 9/2014 | Sugita et al. | |
| 2015/0344991 A1* | 12/2015 | Miyamoto | C22B 59/00 423/21.1 |
| 2017/0137915 A1* | 5/2017 | Hoshi | C22B 59/00 |

FOREIGN PATENT DOCUMENTS

| | | |
|---|---|---|
| CN | 104955969 A | 9/2015 |
| EP | 2 738 270 A1 | 6/2014 |
| EP | 2 952 594 A1 | 12/2015 |
| JP | 2013-204095 A | 10/2013 |
| WO | 96/00698 A1 | 1/1996 |
| WO | 2013/085052 A1 | 6/2013 |

OTHER PUBLICATIONS

Saeki et al., "Environment-Friendly Recycling Process for Rare Earth Metals in End-of-Life Products", Rare Metal Technology, 2014, pp. 103-106.

* cited by examiner

Microstructure d'un aimant Nd-Fe-B

Gonflement de la zone intergranulaire,
déchaussement des grains Nd₂Fe₁₄B

Pulvérisation complète de l'aimant massif

METHOD AND SYSTEM FOR RECOVERING RARE EARTH ELEMENTS FROM WITHIN AN OBJECT

The invention relates to a method and system allowing the recovery of rare earth elements contained in permanent magnets for example. It more generally applies to the recovery of rare earth elements contained in an object composed of at least one rare earth portion or mixture of rare earth elements and at least one metal element or mixture of metal elements or a rare earth/metal alloy.

Permanent magnets containing rare earth elements are considered at the present time to be the best performing magnets and the market associated therewith is constantly increasing. The cost of rare earth elements used to produce objects, in particular magnetic objects or components, is also on the increase. While recycling is one means of reducing the demand for rare earth elements, and thereby of controlling variations in price, it is also a means of preserving the environment since extraction and transformation operations of rare earth-containing ore are highly polluting.

The operating of urban mines formed by waste electrical and electronical equipment (WEEE) has become a method of choice motivated both by the substantial consumption of these elements in industrialized countries, and by preservation of the environment which requires best recycling of the waste that is daily produced by human activity.

The materials concerned are particularly Nd—Fe—B magnets derived directly from the disassembling of WEEE, computer hard disks, loud speakers, electric motors etc. Since these magnets are highly sensitive to corrosion, they are generally coated with one or more films to limit their exposure to air inside electrical and electronic equipment. These films may be of metallic and/or polymeric type. The recycling of these magnets aims at circumventing steps to extract the neodymium contained in a magnetic alloy, these steps currently being performed industrially using heavy chemical processes having recourse to molten metal salts and organic solvents for example.

Different techniques for recycling rare earth elements are known in the prior art.

The article by Hitachi "Environment-Friendly Recycling Process for Rare Earth Metals in End-of-Life Products", Rare Metal Technology 2014, describes a method based on specific equipment and on prior knowledge of the material. In this method, the magnets are attached magnetically to a wheel and the magnetic nickel film is removed by sand blasting. To extract the neodymium from the permanent magnets thus prepared, liquid magnesium is employed to form a Mg—Nd alloy and thereby separate the neodymium from iron. The Mg—Nd alloy thus formed is then separated by vacuum distillation. All these operations require complex, specific equipment.

Patent U.S. Pat. No. 8,734,714 discloses a method to recover rare earths contained in a material whereby the assembly is exposed to hydrogen. This method via hydrogen decrepitation, although presented as being efficient, has the chief disadvantage of using dihydrogen gas that is explosive at high temperatures (up to 600° C.), which generally implies most specific installations for use and reprocessing thereof.

Patent application WO 96/00698 cites an approach wherein a mineral acid is used to produce a rare earth metal salt. It proposes a complete oxidation method of all rare earths and transition metals.

Some methods for the extraction of neodymium involve molten metal salts or strong acid baths. This can be restrictive from an economic and environmental viewpoint.

There is therefore a current need to provide a simple, low-cost method for recovering rare earths contained in objects, the rare earth(s) being alone or in a mixture with other elements.

In the remainder of the description, the expression "metal element" will be used to designate a metal element or by extension a mixture of metal elements.

The word "component" or the word "constituent" will be used to designate a rare earth, a mixture of rare earths or a metal element contained in the object to be processed. An object contains several constituents, The word "element" will be used to designate chemical elements in the meaning of the periodic table.

The expression "solvothermal treatment" designates a reaction performed for example in a sealed enclosure, in the presence of a solvent, of a material to be treated and optionally of one of more reagents.

The invention concerns a method for recovering at least rare earths contained in an object "A" composed of at least a first rare earth portion or mixture of rare earths and a second metal portion, characterized in that it comprises a solvothermal treatment step performed in the presence of at least one solvent, placing the object A in contact with a fluid adapted to cause at least one rare earth portion and/or mixture of rare earths and the metal portion to oxidize in order to separate same, the fluid or mixture of fluids comprising one or more components having a molar mass higher than $2 \text{ g·mol}^{-1}$, the value of the reaction temperature Tr being chosen according to the type of object, with a maximum value lower than the melting point of the object and a minimum value higher than the evaporation temperature of the solvent, the reaction following a scheme $R-M \rightarrow R(X)x + M(X)y$ where R is the rare earth or mixture of rare earths, M is the transition metal, and (X) a group dependent on the fluid used.

The method is applied for example to a magnetic object composed of at least one rare earth and a magnetic alloy, the fluid being a solvent adapted to separate the rare earths from the protective antioxidant layer coating the magnet, the rare earths then being separated by oxidation.

According to one operating mode, the reaction temperature Tr is chosen to be at least equal to the initiation temperature of an oxidation process of the constituent elements of the object, allowing diffusion of the oxidant within the object.

According to another embodiment, a catalyst is used and the value of the reaction temperature Tr is chosen taking the catalyst into account.

According to one embodiment of operation, the fluid is placed under supercritical conditions.

The method can be used for an object comprising a $Nd_2Fe_{14}B$ magnetic phase, in which case, as fluid, an oxidizing solvent is used such as water, the magnetic phase is separated which is disrupted leading to the separation of neodymium and the other elements in the form of crystals, in accordance with the process $Nd_2Fe_{14}B \rightarrow Nd(OH)_3 + Fe_3O_4$. As oxidizing fluid, an oxidizing salt of sodium chloride can be used and/or sulfur oxides, with an operating temperature higher than 100° C.

For example, the object is an electrode in a rare earth/metal alloy used in a primary or secondary battery.

The treatment time can be chosen as a function of the subsequent treatment to be applied to the elements and/or formed crystals at the end of the method.

The method may comprise a pre-treatment step of the object by grinding and/or demagnetization.

The invention also concerns a system for recovering rare earths contained in an object A composed at least of one first rare earth portion or mixture of rare earths and of a second metal portion, characterized in that it comprises at least the following parts:
- an enclosure receiving the object A, and a fluid having characteristics adapted to cause oxidation of a least the first rare earth portion and/or of the second metal portion;
- means to raise the temperature in said enclosure, the value of the reaction temperature Tr being selected to trigger the reaction for implementation of the method of the invention.

Figures 2A, 2B:
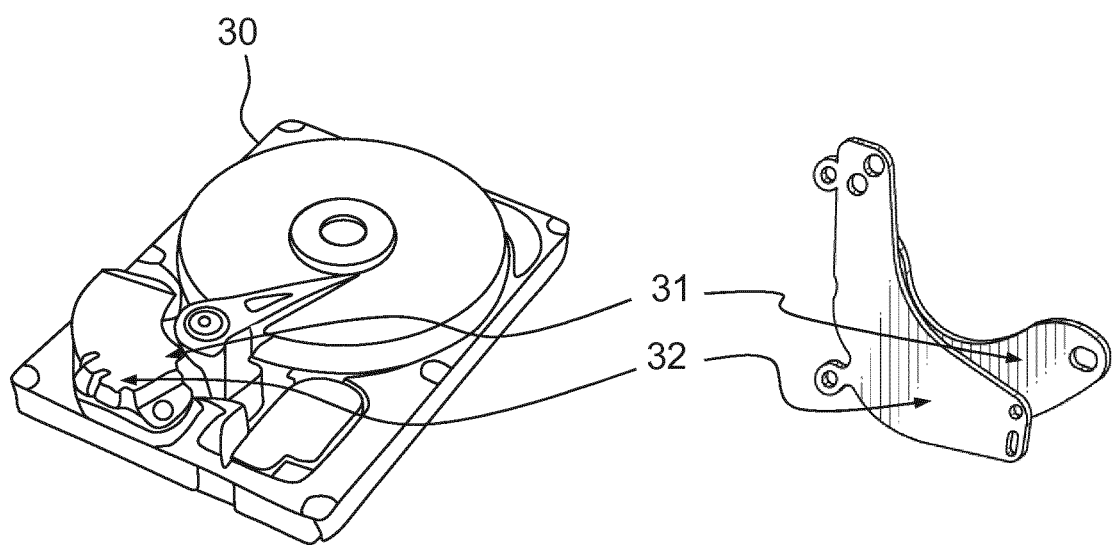
Figure 3A:
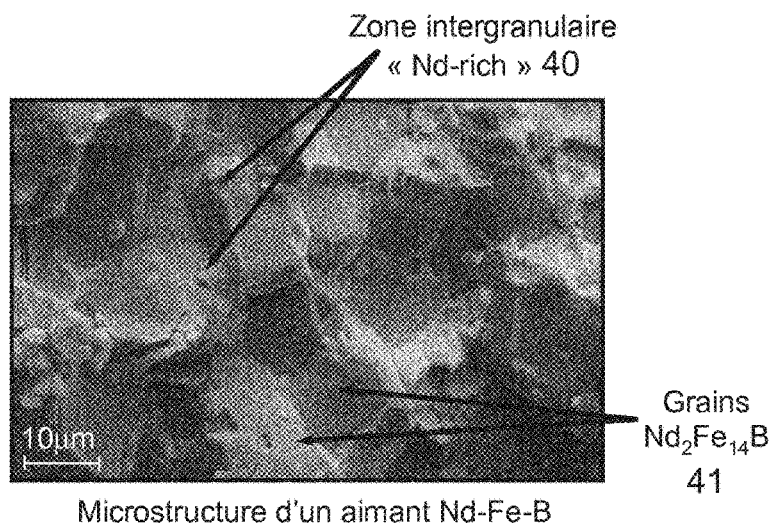
Figure 3B:
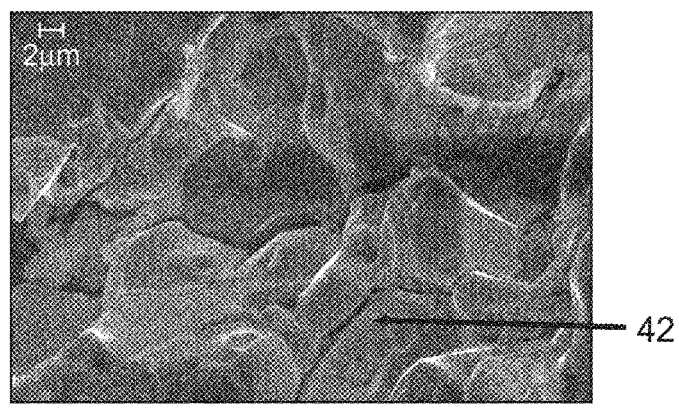
Figure 3C:
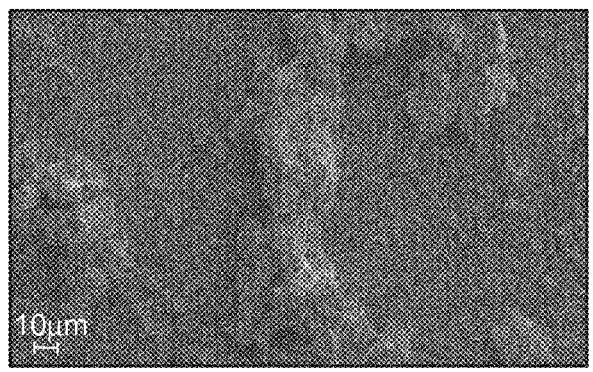
Figure 3D:
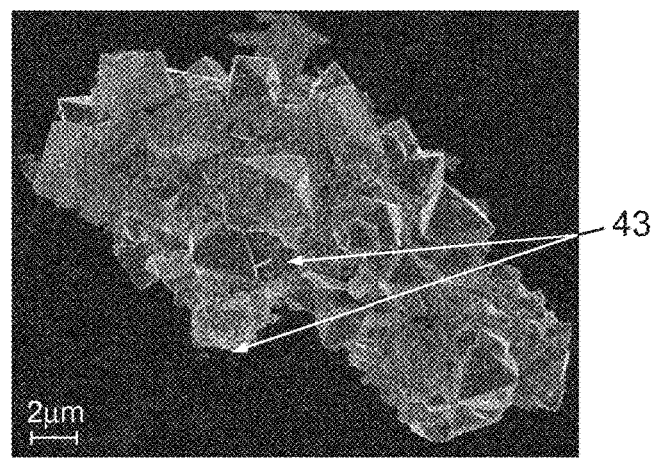
Figure 3E:
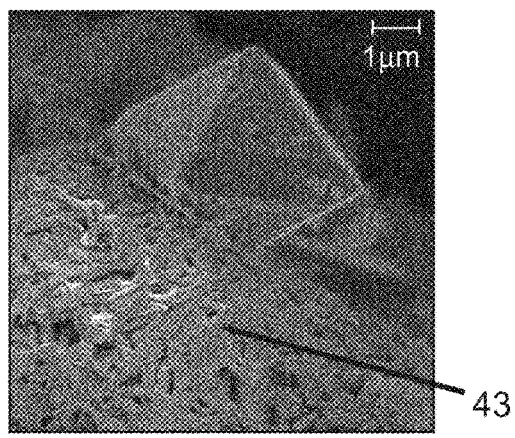
Figure 3F:

Other characteristics and advantages of the present invention will become better apparent on reading the following description given for illustration and in no way limiting, with reference to the appended Figures which illustrate:

FIG. 1, a device allowing implementation of the method of the invention;

FIGS. 2A and 2B, an illustration of a magnet in a hard disk of a computer;

FIGS. 3A and 3F, the result showing the separation of the different elements obtained when implementing the steps of the method of the invention.

FIG. 1 schematises an autoclave enclosure e.g. in Teflon 1, in which an object to be treated is positioned, for example a Nd—Fe—B magnet derived directly from the disassembling of WEEE. The enclosure 1 comprises an opening 2 to insert the object "A" to be treated, and a cover 3 equipped for example with a seal 4 to ensure hermetic sealing. A first inlet line 5 is equipped for example with a valve 6 for injection of a fluid such as a solvent stored in a tank 7, the fluid having the characteristic of causing oxidation at least of the rare earth component and optionally oxidation of a metal element (e.g. iron for tNd—Fe—B alloys) leading to separation of these two rare earth/metal element components. A second evacuation line 8 also equipped with a valve 9 allows evacuation of the solvent once the reaction is completed without having to open the enclosure. The enclosure 1 is also equipped with heating means 10 allowing the required temperature to be reached to initiate oxidation i.e. the reaction which will allow separation. The heating means 10 are a heating resistance for example or any other suitable heating device. The enclosure 1 is equipped with a temperature sensor Ct for example and a pressure sensor Cp to monitor the temperature and pressure prevailing in the enclosure.

FIG. 2B shows a computer hard disk 30 comprising a Nd—Fe—B magnet 31 coated with nickel and mounted on a support 32.

The fluid is a solvent for example that is selected as a function of the type of constituents of the object or element to be treated and of the rare earths contained in object A. For a magnet coated with a protective foil against oxidation, the solvent will notably be selected to oxidize this protective foil. Oxidation initially causes fissuring of the metal film, which enables the solvent to diffuse inside the constituents of the object. At a second stage, swelling will complete the dislocation of the metal film. For a protective foil formed of a polymer and a metal, the same type of behaviour is obtained with the exception that the polymer may dissolve in the solvent if the temperature is sufficient. The fluid may comprise oxidizing salts. The component(s) of the fluid or mixture of fluids used have a molar mass higher than 2 $g \cdot mol^{-1}$. It is also possible to use a catalyst to promote this reaction.

After this solvothermal treatment, depending on the type of treated object and operating conditions, a mixed composition is obtained of rare earths and/or a rare earth in the form of a crystalline phase separated from the other rare earths. The separated rare earths or mixed rare earth compositions are subsequently treated, for example by implementing methods known to persons skilled in the art.

If the object does not have any protection, the solvent will diffuse within the components or constituents of the object.

The solvent used is water for example for reasons of simplicity and low cost. In this case, the temperature will be at least 375° C. for example for reaction conditions in supercritical state, or at least 100° C. for reaction conditions in gaseous state. The maximum treatment temperature $T_{max}$ is chosen to be lower than the melting point $T_{melt}$ of the alloy, and the minimum temperature $T_{min}$ is always higher than the evaporation temperature $T_{evap}$ of the solvent. The reaction is conducted for example at a temperature higher than the boiling point of the solvent and lower than 650-700° C. for example. The pressure value may be autogenous or imposed but will always be higher than 1 bar.

Without departing from the scope of the invention any solvent compatible with the conditions of temperature and pressure and that does not react with the elements of the object e.g. an alloy, can be used. The nonlimiting list of solvents that can be cited for illustration includes: alcohols such as methanol, ethanol, isopropanol, butanol, esters, ketones e.g. acetone, aromatic and aliphatic hydrocarbons, carbides e.g. methylene chloride, alkylene glycols e.g. ethyl glycol and diethyl glycol, a mixture of water and organic solvents. The solvent may be aqueous or non-aqueous but does not have a majority content of acids or mineral bases.

If the object comprises a magnetic $Nd_2Fe_{14}B$ phase, the use can be made of water vapour for example, the magnetic phase is separated and disrupted leading to separation of the neodymium and other elements in crystal from, in accordance with the process $Nd_2Fe_{14}B \rightarrow Nd(OH)_3 + Fe_3O_4$.

Treatment is conducted at high temperature, more specifically at a temperature Tr higher than 20° C., but preferably chosen to be between 200° C. and 400° C. The treatment temperature Tr is chosen in accordance with the following parameters of the system and the knowledge of skilled persons:
- Tr must be higher than a minimum value $T_{min}$ on and after which oxides of the constituent elements of the object are formed, allowing the diffusion of oxygen within the object. For example, it is chosen to be higher than 100° C. for Nd—Fe—B alloys in the $H_2O$—NaCl system:
- as a function of the constituent elements of the object A to be treated (maximum temperature $T_{max}$ to prevent degradation of the elements once separated);
- depending on the type of solvent(s) so as not to cause any reaction with the reactor or degradation of the solvent, or parasitic reactions;
- depending on the pressure and temperature resistance of the reactor;
- depending on the type of heating system, allowing higher or lower temperatures to be reached.

Without departing from the scope of the invention, it will be possible to operate under supercritical conditions. For example, in respect of water, the supercritical state assumes a minimum reaction temperature of 375° C.

A catalyst can be added to accelerate the oxidation process. Any compound allowing a reduction in reaction time can be used, whether by promoting ion displacement of the species contained in solution, or by improving the oxidizing property of the solvent. The added catalysts belong to the family of oxidants conventionally used in industry. Particular mention is made of the following list for illustration purposes but in no way limiting: sulfur oxides such as sulfur dioxide, sodium sulfates and sulfites, sodium chloride, acids or acid mixtures such as hydrochloric acid, nitric acid, sodium hypochlorite, phosphoric acid, carbonic acid, chlorine dioxide, chlorinated hydrocarbons, sodium potassium and ammonium hydroxides, iron chlorides.

For example, sodium chloride NaCl can be used, and sodium metabisulfite used in smaller amount but having a greater impact on reaction time. For example, an aqueous solution can be used having a NaCl concentration of between 1 and 20 mmol·L$^{-1}$, and a $Na_2S_2O_5$ concentration of 0.5 mmol·L$^{-1}$.

For methods conducted under supercritical conditions (in supercritical state), it is possible to add a "surfactant" to allow improved extraction yields; this can be selected by persons skilled in the art as a function of the solvent and of temperature and pressure conditions.

The pressure value is controlled for safety purposes and to prevent possible degradation of rare earths at the time of adverse parallel reactions for example.

Treatment time is notably chosen as a function of the chemical nature of object A and the dimensions and form thereof, and of the temperature to which the reactor is brought. For example, a treatment time of 12 to 24 hours can be chosen to obtain complete pulverization of the material and hence a powder. Treatment time is generally dependent on treatment temperature and is shorter the higher the temperature. It may last between six hours during which the first disassociation steps are observed and twenty-four hours when the alloy is pulverized and disassociated.

The crystallized component(s) can be aged, for example at between about 50 and 200° C., at atmospheric or autogenous pressure for 15 minutes to 48 hours. Ageing treatment can be conducted in the presence of the fluid used for the method, or in the presence of wash waters. This ageing improves crystallinity and/or increases crystallite size. The choice of "ageing" treatment is made for example as a function of subsequent envisaged treatments for mechanical separation of the different constituents obtained at the end of the method.

The method of the invention may comprise the steps described below for example, carried out in one same installation with one same reaction fluid without any operation external to industrial scale operation for example. When implementing the method, the object from which it is sought to recover rare earths is placed in contact at a selected reaction temperature Tr with a fluid having physicochemical characteristics that are adapted for separating the metal portion from the rare earths contained therein via oxidation under temperature conditions chosen to cause oxidation at least of the rare earth or mixture of rare earths and/or of the metal portion following a separating mechanism: R-M→R(X)x+M(X)y where R is the rare earth, M is the metal portion e.g. a transition metal, (X) is a group dependent on the solvent used e.g. oxidizing salts, on reaction temperature and pressure, for example an oxygen O or sulfur S element, or a OH hydroxide group.

A sintered Neodymium-Iron-Boron magnet such as received at a sorting centre may be in various forms. It may be coated with a protective layer such as electrolytic nickel. The microstructure of a sintered Nd—Fe—B magnet is formed of $Nd_2Fe_{14}B$ crystallographic grains of micrometric size, and of an intergranular phase. This intergranular phase is essentially composed of neodymium but also comprises different dopants that may be added by industrialists (dysprosium, praseodymium . . . ).

Regarding a metal alloy comprising rare earths e.g. a permanent Nd—Fe—B magnet as described above, coated with a protective layer, the method initially separates the protective layer from the rare earth-metal assembly via oxidation, for example degradation and fragmentation of the protective metal film. At a second stage, after the film has been detached from the object A, the solvent has access to the alloy and causes separation of the metal portion from the rare earths. The residues of the protective layer can subsequently be removed by mere filtration after opening the enclosure. After cooling of the enclosure, the metal film residues are of millimetric size whereas the magnet powder is of micrometric size, and the protective layer can be directed towards a conventional treatment step known to persons skilled in the art.

The method leads to swelling of the intergranular phases of the sintered materials via oxidation, FIG. 3A (microstructure of a Nd—Fe—B magnet: $Nd_2Fe_{14}B$, grains 41, and intergranular zone 40) leading to pulverization of the solid magnets, FIG. 3C, further to swelling of the intergranular zone 42 and loosening of the crystallographic grains $Nd_2Fe_{14}B$, FIG. 3B.

The powder recovered on completion of the treatment is chiefly composed of neodymium hydroxides $Nd(OH)_3$ and iron oxides $Fe_3O_4$. Throughout the same method, the magnetic phase $Nd_2Fe_{14}B$ dissociates into $Fe_3O_4$ (of octahedral shape) 43, FIG. 3D, and $Nd(OH)_3$ (in rod form) 44, FIG. 3E, leading to separation of the neodymium from the other elements in the form of very distinct crystals. Complete dissociation is observed of the $Nd_2Fe_{14}B$ grains, the octahedral magnetite 43 being detached from the grains, FIG. 3F. The chosen treatment time particularly allows growth of the crystals formed at the time of metal/rare earth separation. Therefore, depending on the separation treatments applied after the "solvothermal" reaction, the treatment time is chosen to vary the size of the recovered crystals.

The neodymium hydroxides are then separated from the iron oxides by applying a weak magnetic field, for example outside the enclosure. In FIG. 3F, the neodymium hydroxide crystals $Nd(OH)_3$ are mostly in rod form if they are derived from dissociation of $Nd_2Fe_{14}B$ grains. The neodymium hydroxide crystals can also have no apparent geometry if they result from degradation of the Nd-rich intergranular phase. Final separation of the compounds can be obtained using any type of known technique e.g. enrichment using physical, grinding and flotation techniques, and/or concentration under gravity on shaker tables, and/or by magnetic separation, and/or any other physical, physicochemical, chemical technique.

According to one variant of embodiment, the method comprises a prior step at which the object is demagnetized. This step can also be conducted in the enclosure by maintaining a temperature higher than the Curie temperature of the magnetic alloy e.g. 320° C. which is the Curie temperature of Nd—Fe—B magnets.

According to one variant of embodiment, the method comprises a prior step at which the object is milled to promote and homogenize diffusion of the fluid within the constituents of the object.

Without departing from the scope of the invention, the steps of the method described in the foregoing can be applied to other families of magnets such as permanent Samarium-Cobalt (Sm—Co) magnets. These magnets are initially composed of SmCo$_5$ crystallographic grains and, after application of the method, the reaction products are Sm(OH)$_3$ and Co$_5$S$_9$. The oxidant salt used in this example is Na$_2$S$_2$O$_5$ which accounts for the onset of the compound Co$_5$S$_9$: the cobalt is oxidized by sulfur. The reaction is longer with Samarium-Cobalt magnets since cobalt is more difficult oxidize than iron but takes place along an equivalent scheme: SmCo$_5$->Sm(OH)$_3$+Co$_5$S$_9$. The enthalpy of cobalt oxide formation being greater than that of neodymium oxides, the energy to be provided is accordingly greater.

The method may also comprise a milling step of the powder resulting from the method, allowing improved magnetic separation yield and thereby enriching the fraction containing the rare earths.

With regard to computer hard disks, since the magnets are attached onto a support by means of resins and/or different glues, the bond is previously dissolved before they are placed in the enclosure for example, using techniques known to skilled persons.

For the treatment of magnetic materials having a polymer matrix such as plasto-magnets, formed of Nd—Fe—B powder dispersed in a polymer matrix, the method comprises a prior treatment step to dissolve the matrix, for example in a first reactor, and it is then evacuated before the steps particular to the invention are carried out. After this step, the Neodymium-Iron-Boron powder contained in this type of magnet is recovered. This powder is then placed in the enclosure with a suitable solvent to separate the neodymium from the other elements.

The method can also be used to recover rare earths contained in primary and secondary batteries having an electrode in a rare earth/NdCo metal alloy, in NiMH primary/secondary batteries (nickel metal hydride), the most common having a Mischmetal/Nickel composition with MmNi$_5$ stoichiometry. Mischmetal is an alloy of rare earths in varying proportions, typically 45 to 50% cerium, 25% lanthanum, 15 to 20% neodymium and 5% praseodymium.

The method can also be used to recover neodymium contained in so-called NdYAG laser crystals formed of neodymium-doped garnet, yttrium and aluminium.

The method of the invention is low cost, it can be implemented in batch or continuous operation (industrial process) and does not require a specific complex installation or safety system as in treatments using hydrogen or molten salts. The technique employed allows removal of the antioxidant protective layer, that in most cases is an electrolytically deposited nickel metal film and allows separation of the rare earth/metal assembly to recover the rare earth, whilst limiting environmental impact. With regard to recycling, the method is just as efficient even if the rare earth/metal assembly is previously degraded, for example after use in equipment, or at the time of disassembling.

The solvent can be reused to recycle other magnets. Since the reaction takes place in a closed medium, there is no evaporation into the atmosphere and there is little impact on the environment. In addition, one same reaction bath can be used numerous times.

The invention claimed is:

1. Method for recovering at least rare earth elements contained in an object A composed of a first rare earth portion or mixture of rare earth elements and of a second metal portion serving as a protective antioxidant layer, the method comprising a solvothermal treatment step performed in the presence of at least one solvent, the solvent being water or water and organic solvent, the solvent optionally comprising catalysts, to place the object "A" in contact with a fluid or mixture of fluids adapted to cause the separation of the rare earth and the metal portions, then the oxidation of at least one rare earth portion and/or mixture of rare earth elements, the fluid or mixture of fluids comprising one or more components having a molar mass higher than 2 g.mol$^-$1, the value of the reaction temperature Tr, wherein Tr is a temperature of the solvothermal treatment, being chosen according to the type of object A, with a maximum value lower than the melting point of the object A and a minimum value higher than the evaporation temperature of the solvent, the reaction following a scheme R-M→R(OH)x+M(O)y where R is the rare earth element or mixture of rare earth elements, and M is a transition metal.

2. The method according to claim 1, wherein the object "A" is a magnetic component composed of at least one rare earth element and a magnetic alloy, the fluid being a solvent adapted to separate the rare earth elements from the protective antioxidant layer formed by the metal portion coating the magnet, the rare earth elements then being separated by oxidation.

3. The method according to claim 1, wherein the reaction temperature Tr is chosen to be at least equal to the initiation temperature of an oxidation process of the constituent elements of the object A, and which allows diffusion of the oxidant within the object A.

4. The method according to claim 1, wherein the fluid is placed under supercritical conditions.

5. The method according to claim 1, wherein the object "A" comprising a Nd$_2$Fe$_{14}$B magnetic phase, an oxidizing solvent is used as fluid, the magnetic phase is dissociated leading to the separation of neodymium and the other elements in the form of crystals, in accordance with the process Nd$_2$Fe$_{14}$B→Nd(OH)$_3$+Fe$_3$O$_4$.

6. The method according to claim 5, wherein the oxidizing solvent comprises salt sodium chloride and/or sulfur oxides, and is conducted at a temperature higher than 100° C.

7. The method according to claim 1, wherein the object A is an electrode in a rare earth/metal alloy used in a primary or secondary battery.

8. The method according to claim 1, wherein the treatment time of the solvothermal treatment is chosen as a function of subsequent treatment of the elements and/or crystals formed at the end of the method.

9. The method according to claim 1, further comprising a pre-treatment step of the object A via grinding and/or demagnetization.

10. System for recovering rare earths contained in an object A composed of at least one first rare earth portion or mixture of rare earth elements and of a second metal portion, the system comprising at least the following parts:
   an enclosure (1) receiving object A and a fluid having characteristics adapted to cause oxidation of at least the first rare earth portion and/or of the second metal portion; and
   means (10) for raising the temperature of said enclosure (1), the value of the reaction temperature Tr being chosen to trigger the reaction for implementation of the method according to claim 1.

11. The method of claim 5, wherein the oxidizing solvent is water.

12. The method according to claim 11, wherein the oxidizing solvent comprises salt sodium chloride and/or sulfur oxides, and is conducted at a temperature higher than 100° C.

* * * * *